United States Patent
Mishra et al.

(10) Patent No.: US 10,447,464 B2
(45) Date of Patent: Oct. 15, 2019

(54) SUPER-SPEED UART WITH PRE-FRAME BIT-RATE AND INDEPENDENT VARIABLE UPSTREAM AND DOWNSTREAM RATES

(71) Applicant: QUALCOMM Incorporated, San Diego, CA (US)

(72) Inventors: Lalan Jee Mishra, San Diego, CA (US); Richard Dominic Wietfeldt, San Diego, CA (US); Elisha Ulmer, Kfar Baruch (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/173,949

(22) Filed: Oct. 29, 2018

(65) Prior Publication Data
US 2019/0173662 A1 Jun. 6, 2019

Related U.S. Application Data
(60) Provisional application No. 62/594,972, filed on Dec. 5, 2017.

(51) Int. Cl.
*H04L 12/40* (2006.01)
*H04L 7/033* (2006.01)
(52) U.S. Cl.
CPC .................. *H04L 7/033* (2013.01)
(58) Field of Classification Search
CPC ............... H04L 7/033; H04L 12/403
See application file for complete search history.

(56) References Cited

U.S. PATENT DOCUMENTS

| | | | | |
|---|---|---|---|---|
| 6,002,733 A * | 12/1999 | Kim | .................. | H04L 23/00 370/431 |
| 2004/0062331 A1* | 4/2004 | Samuel | .................. | H04L 7/0331 375/360 |
| 2004/0233937 A1* | 11/2004 | Ruat | .................. | G06F 13/385 370/516 |
| 2008/0253472 A1* | 10/2008 | Griep | .................. | G08C 23/04 375/295 |
| 2010/0169699 A1 | 7/2010 | Fujimoto | | |
| 2012/0297233 A1* | 11/2012 | Ross | .................. | H04N 21/23602 713/502 |

(Continued)

FOREIGN PATENT DOCUMENTS
WO 2007125472 A2 11/2007

OTHER PUBLICATIONS
International Search Report and Written Opinion—PCT/US2018/058241—ISA/EPO—Apr. 11, 2019.

*Primary Examiner* — Syed Haider
(74) *Attorney, Agent, or Firm* — Loza & Loza, LLP

(57) ABSTRACT

Systems, methods, and apparatus for line multiplexed serial interfaces are disclosed. A method performed by a receiving device includes detecting a first transition in a signal received from a receive line of a UART after the receive line has been idle or following transmission of a stop bit on the receive line, detecting a second transition in the signal, synchronizing a sampling clock to the second transition, where clock cycles of the sampling clock are double the duration between the first transition and the second transition, and using the sampling clock to capture a byte of data from the receive line. One clock cycle of the sampling clock may be consumed while receiving each bit of data.

22 Claims, 11 Drawing Sheets

(56) References Cited

U.S. PATENT DOCUMENTS

2012/0314738 A1* 12/2012 Kashima ............... H04L 12/403
375/219
2015/0074306 A1    3/2015  Ayyagari et al.
2016/0034416 A1    2/2016  Chavez et al.

* cited by examiner

SUPER-SPEED UART WITH PRE-FRAME BIT-RATE AND INDEPENDENT VARIABLE UPSTREAM AND DOWNSTREAM RATES

PRIORITY CLAIM

This application claims priority to and the benefit of U.S. Provisional Patent Application Ser. No. 62/594,972 filed in the U.S. Patent Office on Dec. 5, 2017, the entire content of this application being incorporated herein by reference as if fully set forth below in its entirety and for all applicable purposes.

TECHNICAL FIELD

The present disclosure relates generally to peripheral communications interfaces, and more particularly to integrating interface devices that communicate flow-control signals using reduced pin counts with interface devices that communicate flow-control signals using a pin for each signal.

BACKGROUND

Mobile communication devices may include a variety of components including circuit boards, integrated circuit (IC) devices and/or System-on-Chip (SoC) devices. The components may include processing circuits, user interface components, storage and other peripheral components. Communication between components may be implemented using universal asynchronous receiver/transmitter (UART) devices. In many applications, UART devices may be unable to exchange data within the time available or allotted. The option of increasing bus clock frequency may not be available due to power consumption, cost and complexity concerns.

SUMMARY

Certain aspects of the disclosure relate to systems, apparatus, methods and techniques that provide improved signaling between UARTs using a super-speed UART (SS-UART), as disclosed herein. Certain aspects enable implementation of UART-based full-duplex communication links that can operate at faster transmission speeds, and provide lower latency than conventional UART-based communication links and/or other types of serial communication links Certain architectural enhancements are disclosed to a conventional UART that can simplify design and lower manufacturing costs. Legacy high-speed universal asynchronous receiver/transmitter device (HS-UART) frames and certain presently-disclosed SS-UART data frames can be supported using the disclosed SS-UART full-duplex communication links, where modes of communication and data frame structures may be selectable by configuration. In some examples, certain aspects of the SS-UART data frames may be configured based on application needs. Configuration may be performed during manufacture, during system integration and assembly, at device startup and/or during operation under application or system manager control.

In various aspects of the disclosure, a method performed at a receiving device includes generating a transmit clock, providing a first transition in a signal transmitted on a transmit line of a UART after the transmit line has been idle or following transmission of a stop bit on the transmit line, providing a second transition in the signal, where the second transition is provided one-half cycle of the transmit clock after the first transition, and transmitting a byte of data on the receive line in accordance with timing provided by the transmit clock. One clock cycle of the sampling clock may be consumed while receiving each bit of data.

In various aspects of the disclosure, a clock generator has an edge detection circuit configured to detect a negative-transitioning first edge in a receive signal provided to a UART receiver circuit, and a positive-transitioning second edge in the receive signal, and a delay-locked loop (DLL) responsive to the first edge and the second edge, where the DLL synchronizes a sampling clock to the first edge and the second edge. The sampling clock may be used by the UART receiver circuit to capture data from the receive signal.

In certain aspects, the DLL is configured to synchronize the sampling clock for each data frame in the receive signal. Each data frame may include 8 or more data bits. One or more data frames may include a 7-bit address. One or more data frames may include an 8-bit byte of payload data. One or more data frames may include more than 8 bits of payload data. The DLL may enable per-frame, clock synchronization, with a variable number of data-bits accommodated per-frame, thereby providing throughput advantages.

DETAILED DESCRIPTION

Figure 1:
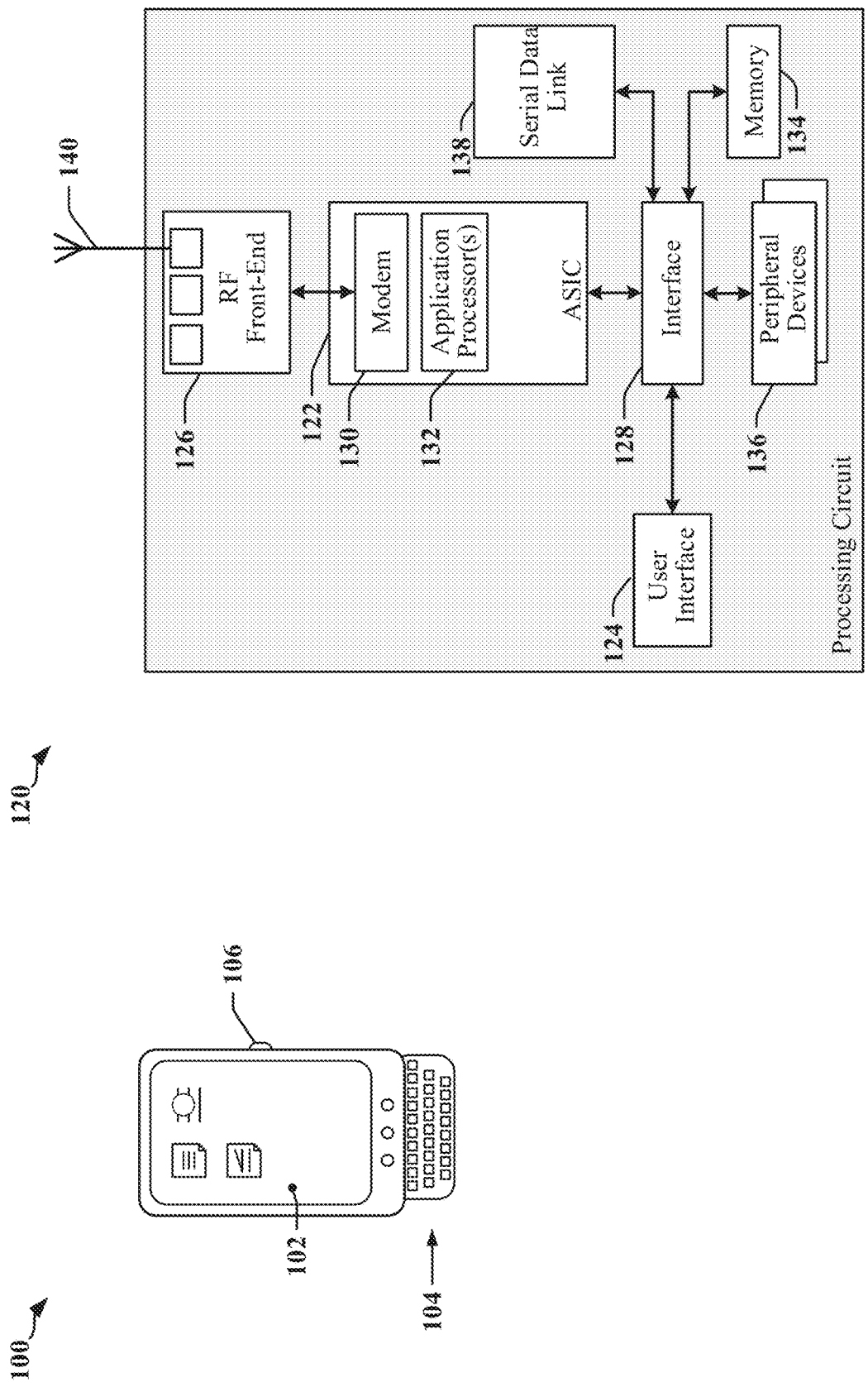
FIG. 1 illustrates one example of an apparatus that may be adapted according to certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoC and other IC devices often employ a serial bus to connect processors with modems and other peripherals. In some instances, it may be desirable to implement a UART-based point-to-point link to support low-latency and/or real-time communication between two devices. With increasing application data volumes, and device speed, the UART-based link may be unable to meet latency requirements in certain applications. Increasing bus clock frequency in conventional systems increase power consumption and typically requires a corresponding increase in frequency of an oversampling clock in the receiver.

Certain aspects of the disclosure relate to systems, apparatus, methods and techniques that provide or employ improved signaling between HS-UARTs using the SS-UART disclosed herein. Certain aspects enable implementation of UART-based full-duplex communication links that can operate at faster transmission speeds, and may provide lower latency than communication links implemented using conventional UARTs. Certain architectural enhancements are disclosed to conventional UARTs that can simplify design and lower manufacturing costs. Legacy HS-UART data frames and presently-disclosed SS-UART data frames are supported and may be selectable by configuration. Certain aspects of the data frames may be configured. Configuration may be performed during manufacture, at startup configuration and/or dynamically during operation. In some implementations, configuration may be performed and/or updated in response to commands received over the SS-UART communication link or under control of an application.

According to certain aspects disclosed herein, the oversampling clock of conventional UARTs can be eliminated or suppressed for high-speed communications and a sampling clock provided at the same frequency as the bus clock. The sampling clock may be generated and synchronized to edges in a one-bit length synchronizing signal using an edge-synchronized DLL clock generator.

EXAMPLE OF AN APPARATUS WITH A SERIAL DATA LINK

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 depicts an example of an apparatus 100 that includes a processing circuit 120 having multiple subcomponents or devices 122, 124, 126, 128, 134, 136, and/or 138. In some instances, the processing circuit 120 may be implemented in, or include an ASIC or SoC. In one example, the apparatus 100 may be incorporated in a communication device and the processing circuit 120 may include an RF front-end circuit 126 that enables the apparatus to communicate through one or more antennas 140 with a radio access network, a core access network, the Internet and/or another network.

In the example illustrated in FIG. 1, the processing circuit 120 includes an ASIC device 122 that has one or more processors 132, one or more modems 130, and/or other logic circuits or functions. The processing circuit 120 may be controlled by an operating system and may provide an application programming interface (API) layer that enables the one or more processors 132 to execute software modules residing in the memory device 134, for example. The software modules may include instructions and data stored in a processor readable storage such as the memory device 134. The ASIC device 122 may access its internal memory, the memory device 134 of the processing circuit 120, and/or external memory. Memory may include read-only memory (ROM) or random-access memory (RAM), electrically erasable programmable ROM (EEPROM), flash cards, or any memory device that can be used in processing systems and computing platforms. The processing circuit 120 may include, or have access to a local database or other parameter storage that can maintain operational parameters and other information used to configure and operate the apparatus 100 and/or the processing circuit 120. The local database may be implemented using registers, a database module, flash memory, magnetic media, EEPROM, optical media, tape, soft or hard disk, or the like. The processing circuit 120 may also be operably coupled to external devices such as the antenna 140, a display 102, operator controls, such as a button 106 and/or an integrated or external keypad 104, among other components. A user interface circuit 124 may communicate with the display 102, external keypad 104, etc. through a dedicated communication link 138 or through one or more serial data interconnects.

The processing circuit 120 may communicate through one or more interface circuits 128, which may include a combination of circuits, counters, timers, control logic and other configurable circuits or modules. In one example, the interface circuit 128 may be configured to operate in accordance with communication specifications or protocols. The processing circuit 120 may include or control a power management function that configures and manages the interface circuit 128, the user interface circuit 124, the RF front-end circuit 126, and the operation of one or more application processors 132 resident in the ASIC device 122, for example.

Overview of the HS-UART

Figure 2:
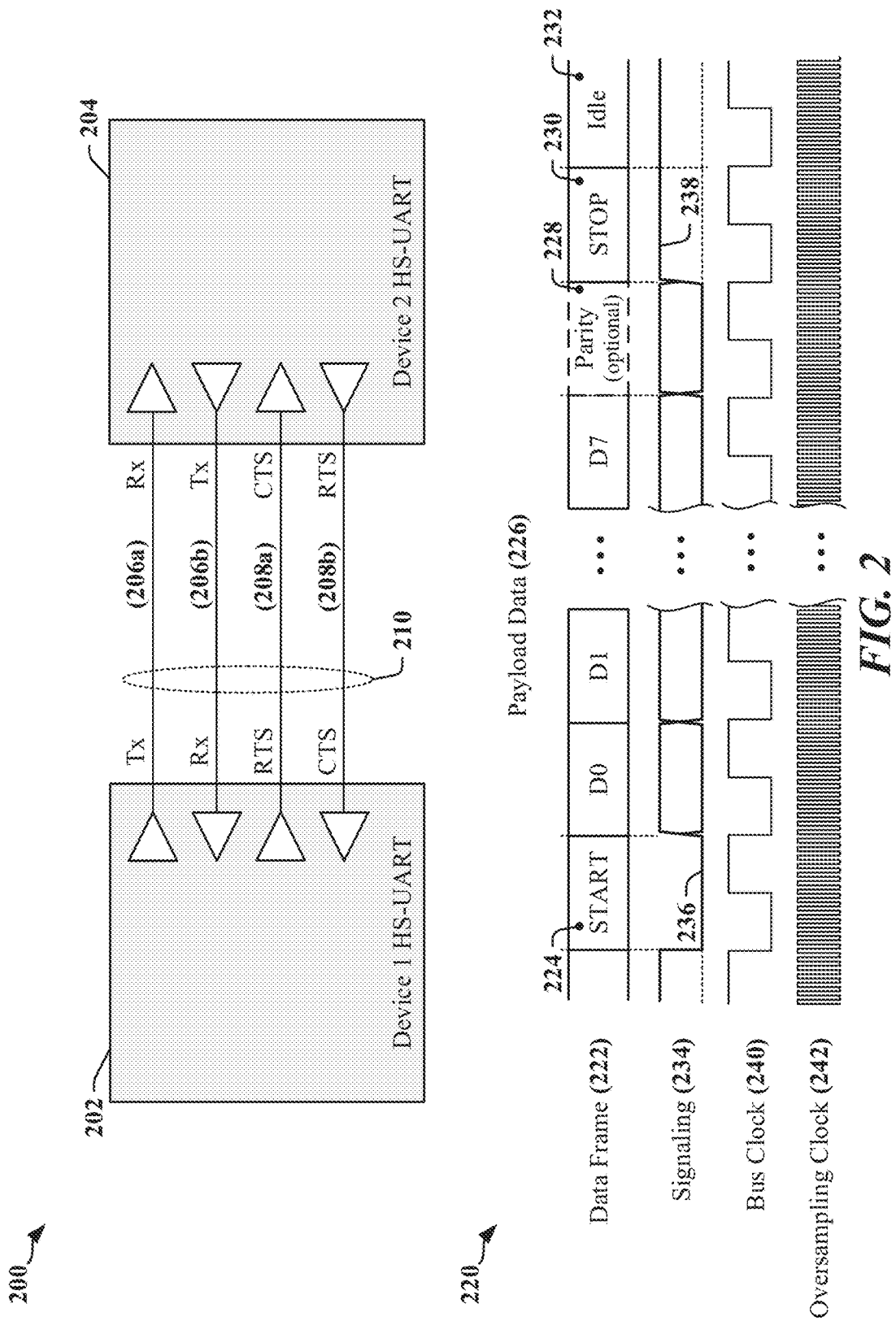
FIG. 2 illustrates an example of a serial interface based on a 4-wire HS-UART.

FIG. 2 illustrates an example of a system 200 that employs HS-UARTs 202, 204 to implement a point-to-point communication link 210. The communication link 210 can operate in a full-duplex mode with flow-control. Data may be transmitted by the first HS-UART 202 over a first wire 206a and received by the first HS-UART 202 from a second wire 206b. Data is received by the second HS-UART 204 from the first wire 206a and the second HS-UART 204 may transmit data over the second wire 206b. The first HS-UART 202 transmits its RTS signal over a third wire 208a to the CTS input of the second HS-UART 204. The CTS signal received by the first HS-UART 202 from a fourth wire 208b is transmitted as the RTS signal of the second HS-UART 204.

The timing diagram 220 provides an example involving the transmission of a data frame 222 by an HS-UART 202, 204 over the communication link 210. The data frame 222 may include payload data 226 (8 data bits) framed by a start bit 224 and a stop bit 230. A parity bit 228 may optionally be appended to the payload data 226 and transmitted before the stop bit 230. An idle period 232 follows the data frame 222 if another transmission does not immediately follow. A corresponding wire 206a or 206b is high during the idle period 232. In some instances, the stop bit 230 may be followed by a start bit of the next data frame.

The data frame 222 is transmitted in binary data signaling 234 on a corresponding wire 206a or 206b. Bits of the data frame 222 are transmitted in accordance with a bus clock signal 240, each bit transmission occupying one clock cycle of the bus clock signal 240. Transmission of the start bit 224 drives the wire 206a or 206b low 236. The payload data 226 and the parity bit 228 are transmitted by driving the wire in accordance with the value of the bit being transmitted. The stop bit 230 is transmitted by driving the wire 206a or 206b high 238.

A receiver may determine the presence and duration of the start bit 224 and/or frequency of the bus clock signal 240 using an oversampling clock 242. The oversampling clock 242 typically has a frequency that is a multiple of the frequency of the nominal frequency of the bus clock signal 240. In one example, the frequency of the oversampling clock 242 may be thirty-two times (32×) the frequency of the bus clock signal 240. In other examples, the frequency of the oversampling clock 242 can be eight times (8×) or sixteen times (16×) the frequency of the bus clock signal 240.

In many instances, HS-UARTs 202, 204 are used to provide a serial interface that can support high-priority, low-latency communication between an application processor and certain types of peripherals. A point-to-point, full-duplex communication link 210 implemented using HS-UARTs 202, 204 can be operated with minimal protocol, and with limited bus latency. For example, bus latency can be adversely affected when multiple devices coupled to a shared link are concurrently active. Degraded latencies can prevent the use of the interface for some low-latency applications such as real-time signaling and control. In one example, a UART-based communication link 210 may be deployed to implement a coexistence management interface (CxMi).

Figure 3:
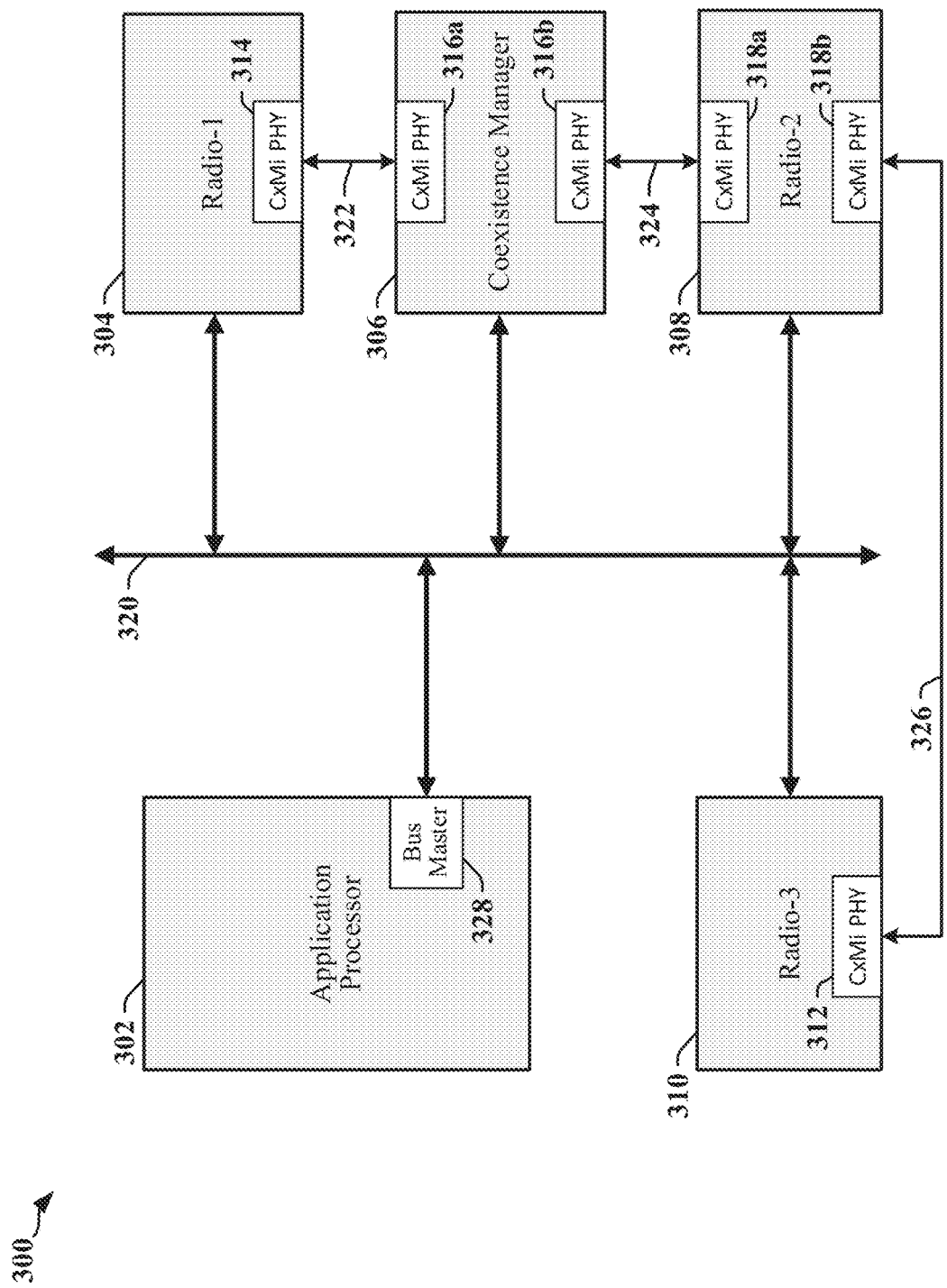
FIG. 3 illustrates certain aspects of a system adapted to support coexistence management functions.

FIG. 3 illustrates certain aspects of a system 300 adapted to support coexistence management functions. An application processor 302 may manage or control multiple radios 304, 308, 310, each of which may include one or more modems, transceivers, antennas, etc. In some instances, the multiple radios 304, 308, 310 may share certain circuits, antennas and other resources. The system 300 may provide or employ a coexistence manager 306 that may be a stand-alone device and/or that may employ functions and circuits in one or more devices 302, 304, 306, 308, 310. The application processor 302, coexistence manager 306 and the radios 304, 308, 310 may communicate over a shared bus 320. In some instances, the application processor 302 includes a bus interface 328 that enables the application processor 302 to operate as a bus master in order to configure the coexistence manager 306 and the radios 304, 308, 310.

In one example, the coexistence manager 306 may communicate with certain radios 304, 308 through point-to-point CxMi links 322, 324, respectively. In another example, coexistence management functions in two radios 308, 310 may interact through a point-to-point CxMi link 326. CxMi physical interface circuits 312, 314, 316a, 316b, 318a, 318b provided in the radios 304, 308, 310 and/or coexistence manager 306 may be based on an HS-UART.

In some examples, a mobile communication device may include various radios to provide a variety of functions for the user. For purposes of this example, the mobile communication device may operate as a cellular telephone, and may include one or more third generation (3G), fourth generation (4G) and/or fifth generation (5G) radios for voice and data, an IEEE 802.11 (WiFi) radio, a Global Positioning System (GPS) radio, and/or a Bluetooth radio, where two or more radios may operate simultaneously.

The coexistence manager 306 and/or coexistence functions and circuits provided in the radios 304, 308, 310 can manage operation of respective radios 304, 308, 310 in order to avoid interference and/or other performance degradation associated with collisions between respective radios 304, 308, 310. Coexistence management functions typically require deterministic communication of commands, configuration and other information. A point-to-point HS-UART-based link can provide sufficiently low latency to support coexistence management functions within the operational limits of the HS-UART.

In conventional systems, HS-UART bit rate has been limited to 4 Mbps. While this bit rate has served the industry well, new emerging applications and devices may not function as desired at the 4-Mbps bit-rate. In one example, co-existence management functions associated with multi-radio architectures, often expect co-existence management messages to be delivered in less than 2.5 µs. A conventional HS-UART communication link 210 can provide a shortest possible co-existence datagram that is 8-bits length, with Start and Stop bits for a minimum length of 10-bits. At 4 MHz, the minimum transmission time would be:

$$t_{Datagram} = 10 \times \left(\frac{1}{4 \times 10^6}\right) = 2.5 \text{ µs},$$

which breaks the real-time co-existence management timing constraint requirement. A brute force method to circumvent this timing issue is to raise the frequency of the bus clock signal 240 to support an 8 Mbps bit-rate. Increasing the bus clock frequency necessitates doubling the frequency of the oversampling clock 242, with significant impact on power consumption.

Super-Speed UART

Certain aspects disclosed herein provide apparatus and methods for increasing the frequency of the bus clock signal 240 without incurring an undesired power impact attributable to an oversampling clock 242. In some aspects, the oversampling clock 242 can be eliminated in an SS-UART, and data signaling 234 can be sampled using a sampling clock closely matched to the frequency of the bus clock signal 240.

Figure 4:
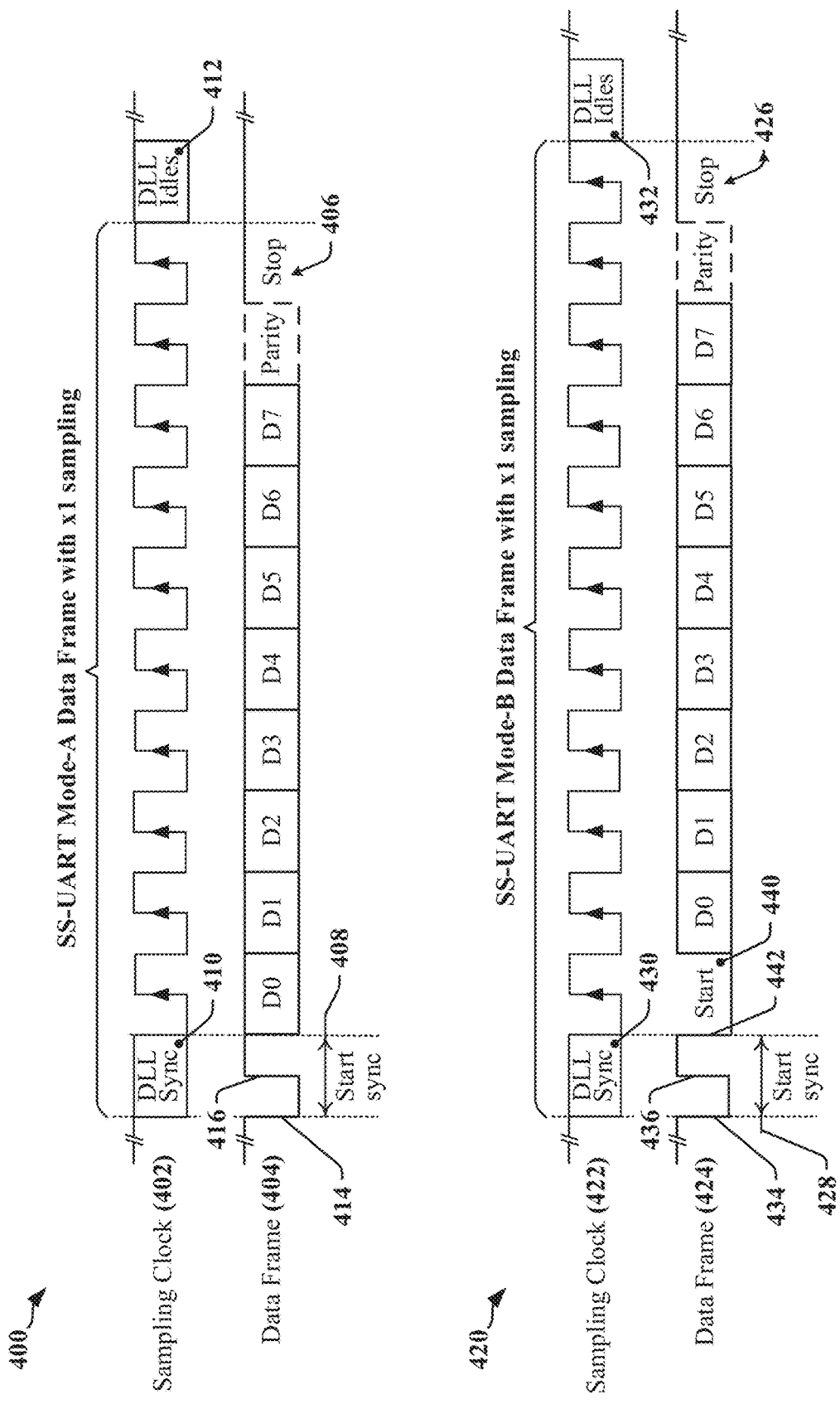
FIG. 4 illustrates two modes of data sampling in an SS-UART in accordance with certain aspects of the disclosure.

FIG. 4 illustrates two modes 400, 420 of data sampling in an SS-UART implemented in accordance with certain aspects of the disclosure. The SS-UART may transmit and/or receive SS-UART data frames 404, 424 that have a structure adapted to enable the generation of a sampling clock 402, 422 that operates without oversampling. In a first mode 400, the conventional start bit 224 is replaced by Start-Sync signaling 408 in a first SS-UART data frame 404. The Start-Sync signaling 408 has a duration of one bus clock cycle, which is equivalent to the time taken to transmit 1-bit of data. The Start-Sync signaling 408 commences with a transition 414 from the high state of the previous idle or stop bit, to a low state. After a delay equivalent to a half-cycle of the bus clock, the Start-Sync signaling 408 continues with a transition 416 to the high state, and the high state is maintained for a second half-cycle of the bus clock. The first transition 414 and/or the second transition 416 provide an edge that can be used to synchronize the sampling clock 402. In one example, an edge-synchronized delay-locked loop (DLL) may be configured to generate the sampling clock 402. The DLL may be synchronized to the negative-going edge of the first transition 414. In the first SS-UART data frame 404, the sampling clock 402 has a period of 1 bit-transmission time (1 bus clock cycle).

In a second mode 420, a second SS-UART data frame 424 includes a start bit 440 that is provided after the Start-Sync signaling 428. The Start-Sync signaling 428 has a duration of one bus clock cycle, which is equivalent to the time taken to transmit 1-bit of data. The Start-Sync signaling 428 commences with a transition 434 from the high state of the previous idle or stop bit, to a low state. After a delay equivalent to a half-cycle of the bus clock, the Start-Sync signaling 428 continues with a transition 436 to the high state, and the high state is maintained for a second half-cycle of the bus clock. The first transition 434 and/or the second transition 436 provide an edge that can be used to synchronize the sampling clock 422. In one example, an edge-synchronized DLL may be configured to generate the sampling clock 422. The DLL may be synchronized to the negative-going edge of the first transition 434 in order to generate the sampling clock 422. In the illustrated example, two bus clock cycles are expended at the start of the second SS-UART data frame 424 to provide the one-bit sampling clock 422 and the one-bit start bit 440. The provision of the start bit 440 causes a second negative-going edge in the transition 442 between the Start-Sync signaling 428 and the start bit 440, which may be used for synchronization in some instances. The provision of the start bit 440 also provides a known bit value for decoder cross-check at the beginning of the SS-UART data frame 424.

The DLL-generated sampling clock 402, 422 can be used to reliably latch received data bits. A significant reduction in power consumption can be attained because the DLL-generated sampling clock 402, 422 is synchronized with the bus clock based on the Start-Sync signaling 408, 428 and without needing an oversampling clock to be continuously active throughout the upcoming payload. In certain implementations, the bus clock of an SS-UART can be doubled or quadrupled with respect to the clock frequency available to an HS-UART. In some implementations, clock generation by the DLL may be automatically halted in a period 412, 432 after the successful reception of the stop-bit 406, 426, providing further power savings.

The SS-UART can support conventional UART and HS-UART features, including transmission and reception of parity bits for error detection, and responsiveness to break conditions (prolonged line low). The SS_UART may support in-band flow control as provided in a line-multiplexed UART (LM-UART).

Figure 5:
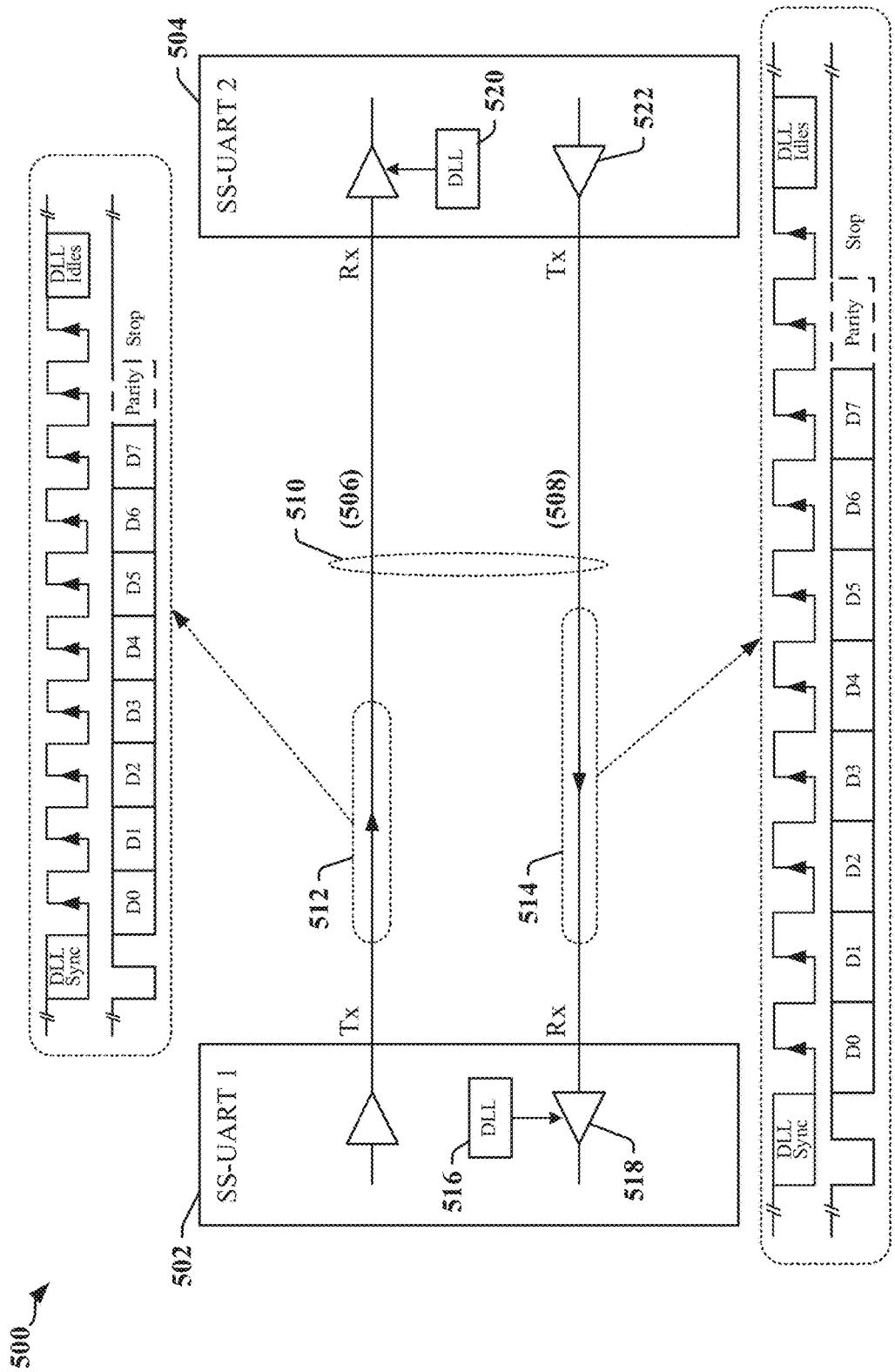
FIG. 5 illustrates certain aspects in which SS-UARTs can support independent bit-rates in accordance with certain aspects disclosed herein.

FIG. 5 illustrates certain aspects related to the implementation of a system 500 that includes SS-UARTs 502, 504 operable to support independent bit-rates on the wires or lines 506, 508 of the communication link 510. When a first SS-UART 502 is receiving a datagram 514 on its receive line 508, a DLL 516 of the first SS-UART 502 that is assigned to the receiving circuit 518 can be operated during a synchronization period 410, 430 to synchronize to the Start-Sync signaling 408, 428 transmitted on the receive line 508. When a second SS-UART 504 is receiving a datagram 512 on its receive line 506, a DLL 520 of the second SS-UART 504 that is assigned to the receiving circuit 522 can be operated to synchronize to the Start-Sync signaling 408, 428 transmitted on the receive line 506. The DLLs 516 and 520 operate independently, and can operate over a desired range of bus clock frequencies. In the illustrated example, the datagram 512 received by the second SS-UART 504 is clocked at a higher frequency than the datagram 514 received by the first SS-UART 502.

Figure 6:
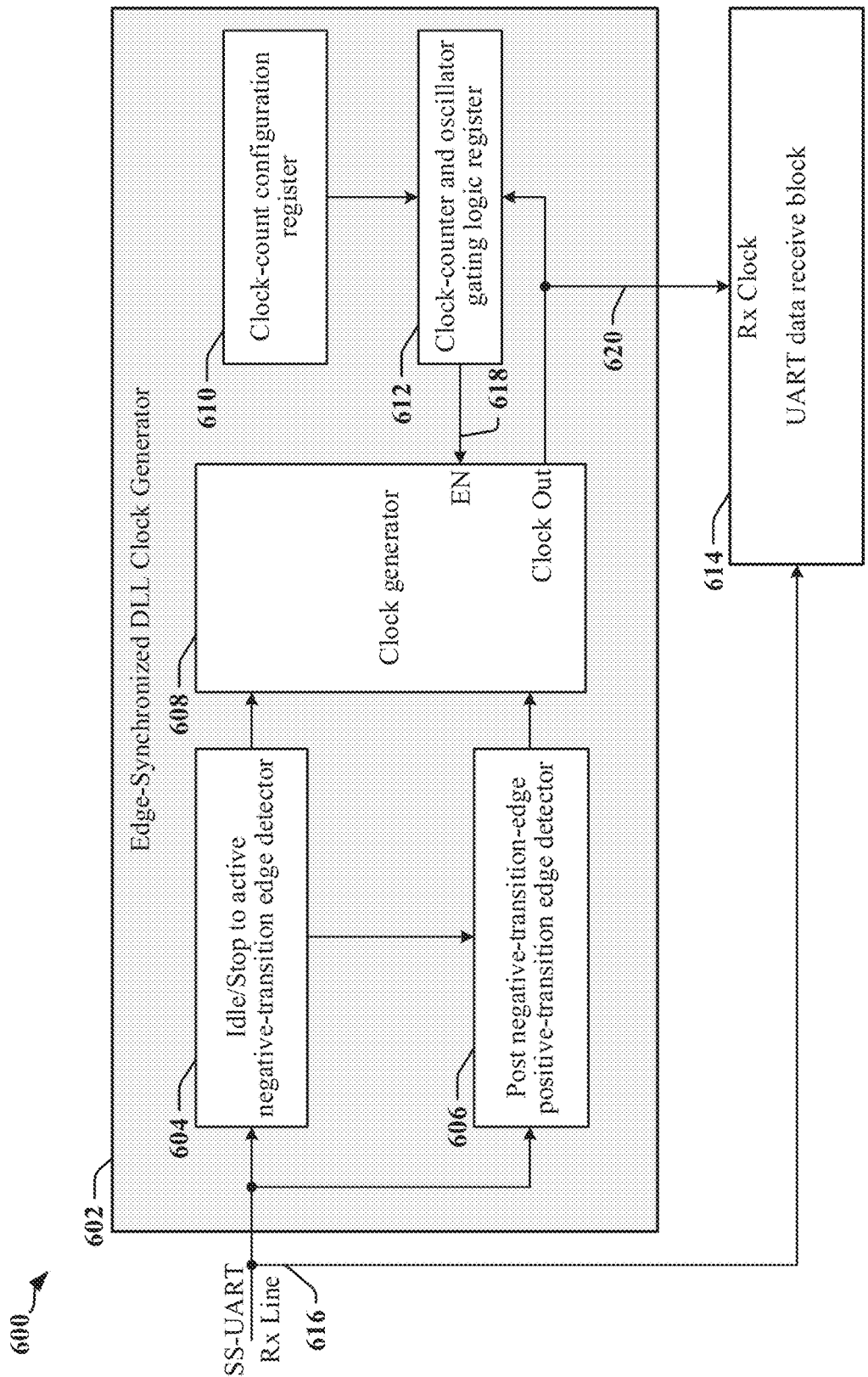
FIG. 6 illustrates an edge-synchronized DLL clock generator in accordance with certain aspects disclosed herein.

FIG. 6 illustrates an example of an apparatus 600 that includes an edge-synchronized DLL clock generator 602 in accordance with certain aspects disclosed herein. The DLL clock generator 602 may be activated when a first detector 604 detects a negative-going edge in the receive line 616 of the SS-UART after a stop-bit or idle-period. A second detector 606 may provide additional timing information by detecting a positive-going edge in the receive line 616 of the SS-UART after a negative-going edge. In one example, the Start-Sync signaling 408, 428 is used to automatically select an internal loop delay of the clock generator circuit 608 that generates the receive clock (Rx clock 620). The duration of clock cycles of the Rx clock 620 is controlled by gating logic 612 based on the value set in a clock count configuration register 610. The gating logic 612 may provide one or more control and/or enable signals 618 to the clock generator circuit 608. A known data frame configuration may be assumed after initial power-on reset. In one example, this data frame configuration defines a datagram with 8 data bits and no-parity.

In some implementations, the DLL clock generator 602 may enter an idle phase after latching in the incoming data frame. The clock generator circuit 608 may be idled to suppress higher-frequency switching that otherwise contributes significantly to power consumption by the DLL clock generator 602 and/or UART data receive block 614. The DLL clock generator 602 may include circuits or modules that can detect the stop bit that terminates the data frame. When no stop bit is detected the clock generator circuit 608 may remain active in order to drive the Rx clock signal in anticipation of break condition detection.

Modes Of Operation Of A Super-Speed UART

An SS-UART implemented according to certain aspects disclosed herein can be operated in a variety of different configurations. As illustrated in FIG. 4, the SS-UART may select a type of SS-UART data frame 404, 424 based on a configuration indicated by an application or by design. In one example, the configuration of the SS-UART may be defined during manufacture, system integration or system initialization. The configuration of the SS-UART may be selected based on the type of UART connected to the SS-UART. In some instances, the SS-UART may be configured to communicate with a legacy HS-UART.

In another example, the configuration of the SS-UART may be defined through configuration by application, negotiation with a UART connected to the SS-UART or in response operating conditions, including operating conditions determined through system power management commands. In another example, the configuration of the SS-UART may be defined dynamically, by transaction, or by data frame.

Figure 7:
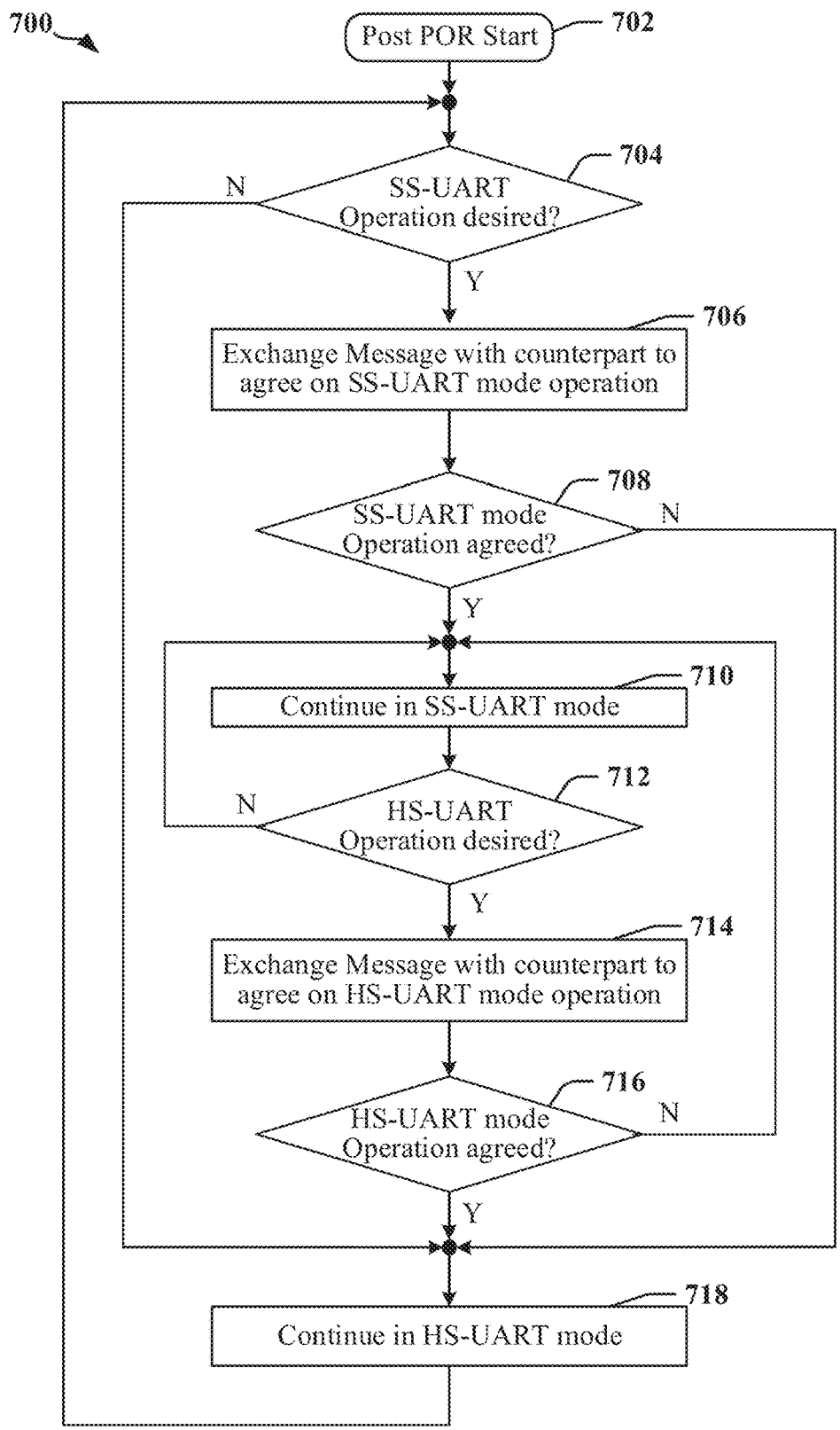
FIG. 7 illustrates dynamic configuration of UART operation in accordance with certain aspects disclosed herein.

FIG. 7 is a flowchart 700 that illustrates dynamic configuration of UART operation. In the example, a first UART may initially be emerging from initialization 702 after a power-on-reset. The first UART may be configured for HS-UART operation and may be exchanging configuration information with a second UART that is co-resident on a point-to-point link. The first UART may determine at block 704 whether SS_UART operation is desired. When SS-UART mode is not desired, the first UART may continue in HS-UART mode at block 718. When SS-UART mode is desired, the first UART may exchange one or more messages with the second UART at block 706 to initiate SS-UART mode. If the first and second UARTs do not agree at block 708 to enter SS-UART mode, then the first UART may continue in HS-UART mode at block 718. If the first and second UARTs agree to enter SS-UART mode at block 708, then the first UART may initiate and/or continue operation in SS-UART mode at block 710.

While in SS-UART mode at block 710, the first and/or second UART may transmit one or more messages requesting a change to HS-UART mode. For example, at block 712 the first UART may determine whether HS-UART mode is desired. When HS-UART mode is not desired, the first UART may continue in SS-UART mode at block 710. When HS-UART mode is desired, the first UART may exchange one or more messages with the second UART at block 714 to initiate HS-UART mode. If the first and second UARTs do not agree at block 716 to enter HS-UART mode, then the first UART may continue in SS-UART mode at block 710. If the first and second UARTs agree to enter HS-UART mode at block 716, then the first UART may initiate and/or continue operation in HS-UART mode at block 718.

While in HS-UART mode at block 718, the first and/or second UART may transmit a message requesting a change to SS-UART mode. The first UART may return to block 704 to determine whether HS-UART mode is desired.

Examples of Processing Circuits and Methods

Figure 8:
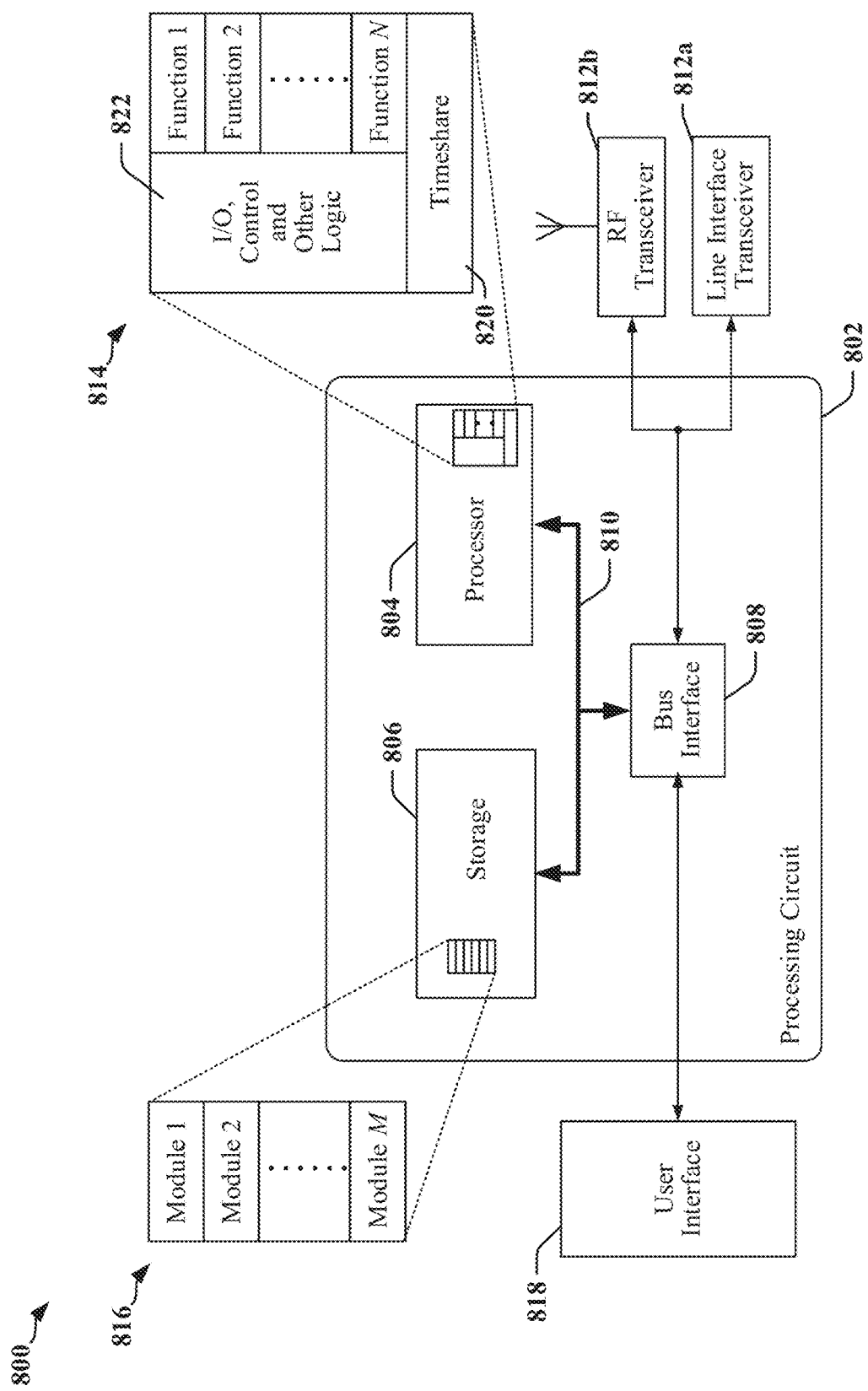
FIG. 8 illustrates ant example of a hardware implementation for an apparatus in accordance with certain aspects disclosed herein.

FIG. 8 is a diagram illustrating an example of a hardware implementation for an apparatus 800 employing a processing circuit 802 that may be configured to perform one or more functions disclosed herein. In accordance with various aspects of the disclosure, an element, or any portion of an element, or any combination of elements as disclosed herein may be implemented using the processing circuit 802. The processing circuit 802 may include one or more processors 804 that are controlled by some combination of hardware and software modules. Examples of processors 804 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 804 may include specialized processors that perform specific functions, and that may be configured, augmented or controlled by one of the software modules 816. The one or more processors 804 may be configured through a combination of software modules 816 loaded during initialization, and further configured by loading or unloading one or more software modules 816 during operation.

In the illustrated example, the processing circuit 802 may be implemented with a bus architecture, represented generally by the bus 810. The bus 810 may include any number of interconnecting buses and bridges depending on the specific application of the processing circuit 802 and the overall design constraints. The bus 810 links together various circuits including the one or more processors 804, and storage 806. Storage 806 may include memory devices and mass storage devices, and may be referred to herein as computer-readable media and/or processor-readable media. The bus 810 may also link various other circuits such as timing sources, timers, peripherals, voltage regulators, and power management circuits. A bus interface 808 may provide an interface between the bus 810 and one or more transceivers 812a, 812b. A transceiver 812a, 812b may be provided for each networking technology supported by the processing circuit. In some instances, multiple networking technologies may share some or all of the circuitry or processing modules found in a transceiver 812a, 812b. Each transceiver 812a, 812b provides a means for communicating with various other apparatus over a transmission medium. Depending upon the nature of the apparatus 800, a user interface 818 (e.g., keypad, display, speaker, microphone, joystick) may also be provided, and may be communicatively coupled to the bus 810 directly or through the bus interface 808.

A processor 804 may be responsible for managing the bus 810 and for general processing that may include the execution of software stored in a computer-readable medium that may include the storage 806. In this respect, the processing circuit 802, including the processor 804, may be used to implement any of the methods, functions and techniques disclosed herein. The storage 806 may be used for storing data that is manipulated by the processor 804 when executing software, and the software may be configured to implement any one of the methods disclosed herein.

One or more processors 804 in the processing circuit 802 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 806 or in an external computer-readable medium. The external computer-readable medium and/or storage 806 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 806 may also include, by way of example, a carrier wave, a transmission line, and any other suitable medium for transmitting software and/or instructions that may be accessed and read by a computer. Computer-readable medium and/or the storage 806 may reside in the processing circuit 802, in the processor 804, external to the processing circuit 802, or be distributed across multiple entities including the processing circuit 802. The computer-readable medium and/or storage 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 806 may maintain software maintained and/or organized in loadable code segments, modules, applications, programs, etc., which may be referred to herein as software modules 816. Each of the software modules 816 may include instructions and data that, when installed or loaded on the processing circuit 802 and executed by the one or more processors 804, contribute to a run-time image 814 that controls the operation of the one or more processors 804. When executed, certain instructions may cause the processing circuit 802 to perform functions in accordance with certain methods, algorithms and processes described herein.

Some of the software modules 816 may be loaded during initialization of the processing circuit 802, and these software modules 816 may configure the processing circuit 802 to enable performance of the various functions disclosed herein. For example, some software modules 816 may configure internal devices and/or logic circuits 822 of the processor 804, and may manage access to external devices such as the transceiver 812a, 812b, the bus interface 808, the user interface 818, timers, mathematical coprocessors, and so on. The software modules 816 may include a control program and/or an operating system that interacts with interrupt handlers and device drivers, and that controls access to various resources provided by the processing circuit 802. The resources may include memory, processing time, access to the transceiver 812a, 812b, the user interface 818, and so on.

One or more processors 804 of the processing circuit 802 may be multifunctional, whereby some of the software modules 816 are loaded and configured to perform different functions or different instances of the same function. The one or more processors 804 may additionally be adapted to manage background tasks initiated in response to inputs from the user interface 818, the transceiver 812a, 812b, and device drivers, for example. To support the performance of multiple functions, the one or more processors 804 may be configured to provide a multitasking environment, whereby each of a plurality of functions is implemented as a set of tasks serviced by the one or more processors 804 as needed or desired. In one example, the multitasking environment may be implemented using a timesharing program 820 that passes control of a processor 804 between different tasks, whereby each task returns control of the one or more processors 804 to the timesharing program 820 upon completion of any outstanding operations and/or in response to an input such as an interrupt. When a task has control of the one or more processors 804, the processing circuit is effectively specialized for the purposes addressed by the function associated with the controlling task. The timesharing program 820 may include an operating system, a main loop that transfers control on a round-robin basis, a function that allocates control of the one or more processors 804 in accordance with a prioritization of the functions, and/or an interrupt driven main loop that responds to external events by providing control of the one or more processors 804 to a handling function.

Figure 9:
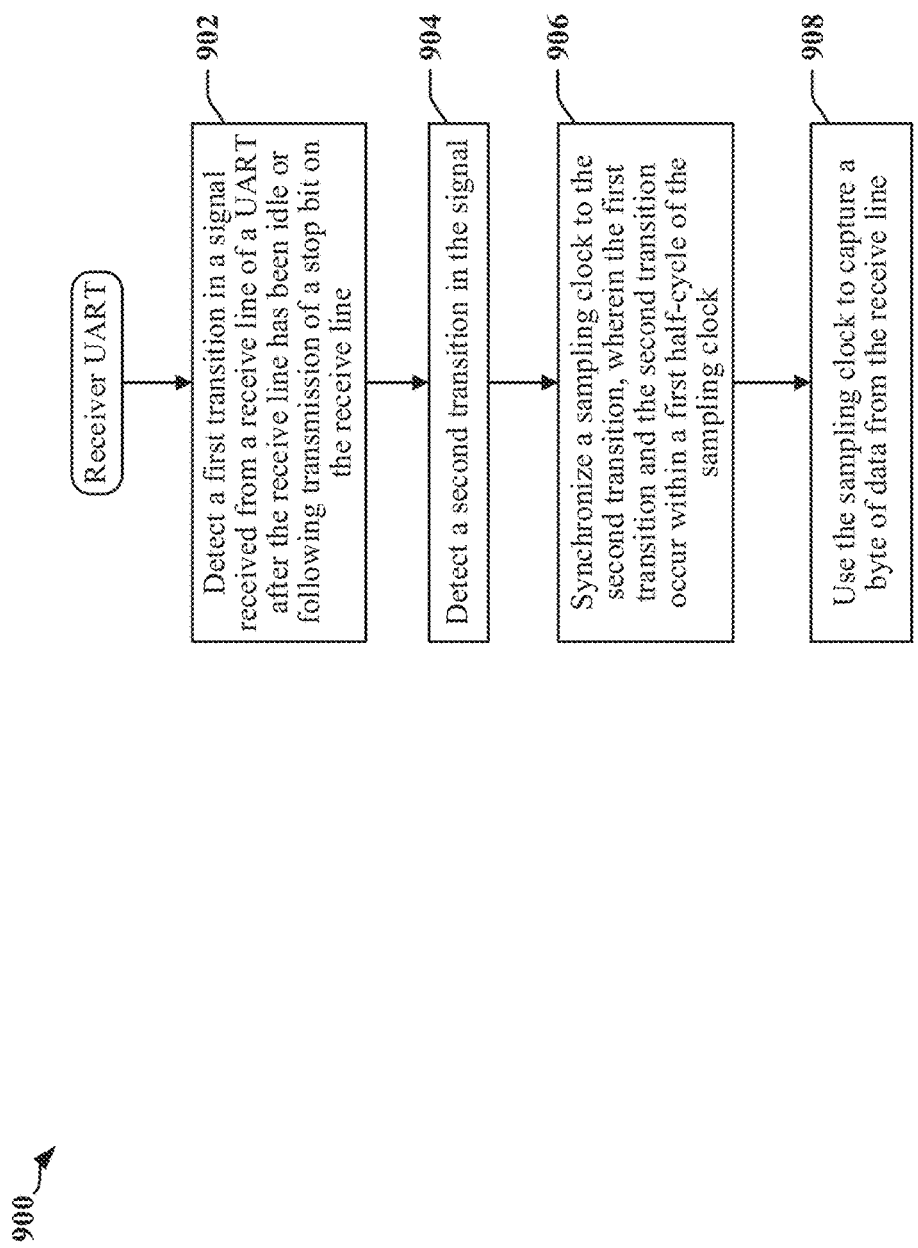
FIG. 9 is a flowchart of a first example of method of operating an SS-UART interface in accordance with certain aspects disclosed herein.

FIG. 9 is a flowchart 900 of a first method that may be performed at a receiving UART that may be operable in both HS-UART and SS-UART modes. At block 902, the UART may detect a first transition in a signal received from a receive line of the UART after the receive line has been idle or following transmission of a stop bit on the receive line.

At block 904, the UART may detect a second transition in the signal. At block 906, the UART may synchronize a sampling clock to the second transition. The first transition and the second transition occur within a first half-cycle of the sampling clock. In one example, the sampling clock generated by the DLL has a time-period that is twice the period elapsed between the negative-going and positive-going edges of Start-Sync signaling. At block 908, the UART may use the sampling clock to capture a byte of data from the receive line. One clock cycle of the sampling clock may be consumed while receiving each bit of data. In one example, one bit of payload or control data may be received in each clock cycle of the sampling clock.

In one example, the UART may receive a start bit from the receive line before capturing the byte of data. In certain examples, the UART enables a clock generator after detecting the first transition. The clock generator may be configured to generate the sampling clock when enabled. The UART may detect a stop bit on the receive line, and disable the clock generator after detecting the stop bit. The clock generator may be configured to suppress the sampling clock when disabled.

In some examples, the UART may receive a message from a transmitting device requesting the receiving device to enter an SS-UART mode of operation prior to detecting the first transition. The UART may initiate the SS-UART mode of operation in response to the message. The UART may initiate the SS-UART mode of operation by enabling an edge-synchronized delay-locked loop in the clock generator.

In some examples, the UART may receive a message from a transmitting device requesting the receiving device to enter an HS-UART mode of operation, and the UART may initiate the HS-UART mode of operation in response to the message. The UART may initiate the HS-UART mode of operation by disabling an edge-synchronized delay-locked loop in the clock generator, and cause the clock generator to generate the sampling clock using an oversampling clock.

In some examples, the UART may transmit a first message to a transmitting device requesting the transmitting device to enter a SS-UART mode of operation prior to detecting the first transition, receive a second message in response to the message, and initiate the SS-UART mode of operation in response to the second message. The UART may initiate the SS-UART mode of operation by enabling an edge-synchronized delay-locked loop in the clock generator.

In some examples, the UART may transmit a message to a transmitting device requesting the transmitting device to enter an HS-UART mode of operation, receive a second message in response to the message, and initiate the HS-UART mode of operation in response to the second message. The UART may initiate the HS-UART mode of operation by disabling an edge-synchronized delay-locked loop in the clock generator, and causing the clock generator to generate the sampling clock using an oversampling clock.

In one example, the UART may transmit data over a transmit line of the UART at a bit-rate different from a bit-rate at which the byte of data is received from the receive line. Bit-rates of transmissions in transmit and receive directions may be mutually independent.

In various examples, the UART may use an edge-synchronized delay-locked loop to synchronize the sampling clock at the commencement of each of a plurality of data frames transmitted on the receive line. The DLL may be configured to synchronize the sampling clock for each data frame in the receive signal. Each data frame may include 8 or more data bits. One or more data frames may include a 7-bit address. The sampling clock has a period that is double a duration of time elapsed between two edges detected after the receive line has been idle or following transmission of a stop bit on the receive line. One or more data frames may include an 8-bit byte of payload data. One or more data frames may include more than 8 bits of payload data. The DLL may enable per-frame, clock synchronization, with a variable number of data-bits accommodated per-frame, thereby providing throughput advantages.

Figure 10:
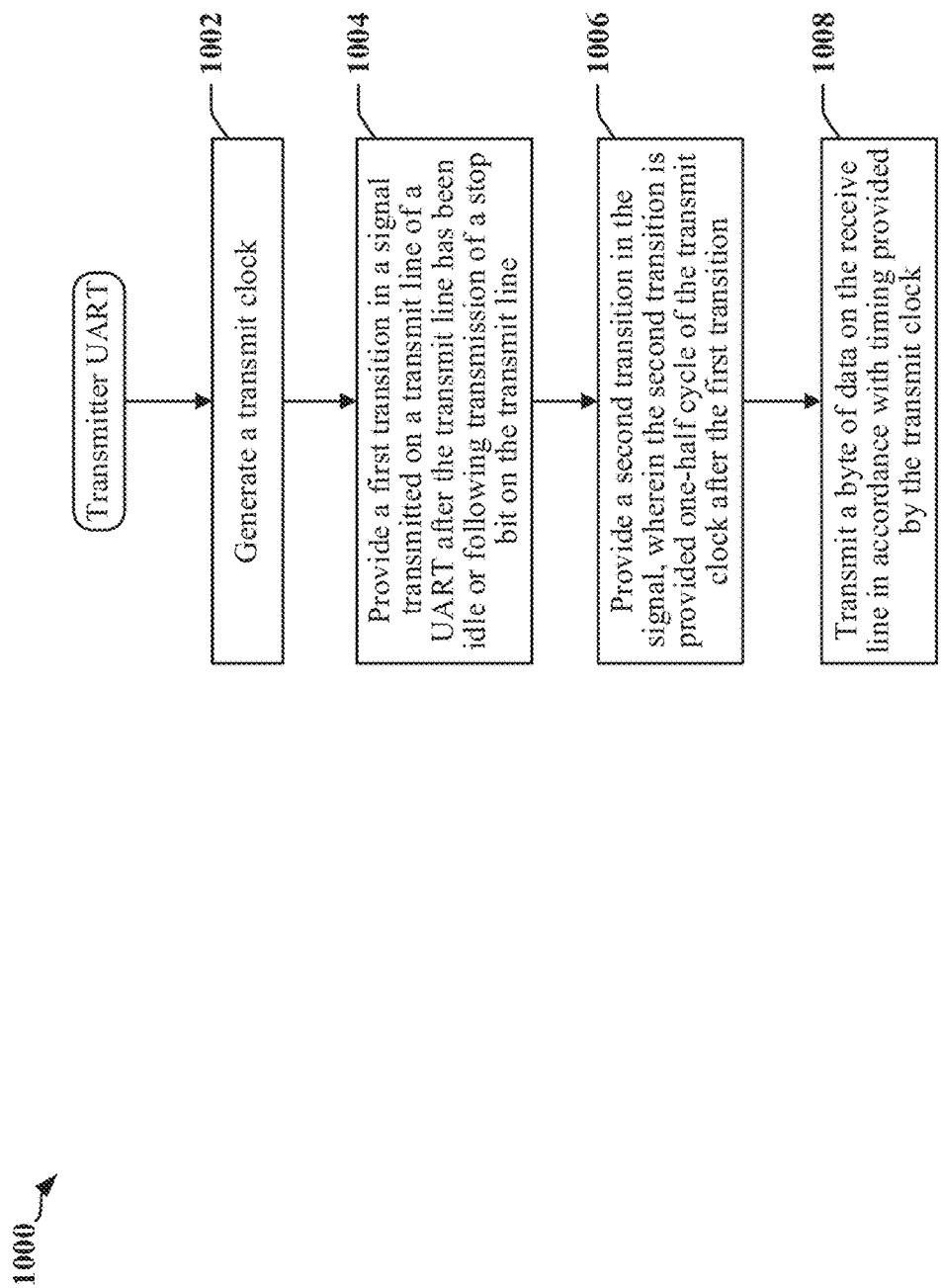
FIG. 10 is a flowchart of a second example of method of operating an SS-UART interface in accordance with certain aspects disclosed herein.

FIG. 10 is a flowchart 1000 of a first method that may be performed at a transmitting UART. At block 1002, the UART may generate a transmit clock. At block 1004, the UART may provide a first transition in a signal transmitted on a transmit line of the UART after the transmit line has been idle or following transmission of a stop bit on the transmit line. At block 1006, the UART may provide a second transition in the signal. The second transition may be provided one-half cycle of the transmit clock after the first transition.

At block 1008, the UART may transmit a byte of data on the receive line in accordance with timing provided by the transmit clock. In one example, one bit of payload or control data may be transmitted in each clock cycle of the sampling clock. The UART may transmit a start bit from the receive line before the byte of data. The UART may transmit a stop bit on the receive line after the byte of data.

In some examples, the UART may receive a message from a receiving device requesting the receiving device to enter an SS-UART mode of operation prior to providing the first transition, and initiate the SS-UART mode of operation in response to the message. The UART may initiate the SS-UART mode of operation by transmitting synchronizing signaling before transmitting the byte of data. The synchronizing signaling may include the second transition.

In some examples, the UART may transmit a first message to a receiving device requesting the receiving device to enter an SS-UART mode of operation prior to detecting the first transition. The UART may receive a second message in response to the first message, and may initiate the SS-UART mode of operation in response to the second message. The UART may initiate the SS-UART mode of operation by transmitting synchronizing signaling before transmitting the byte of data. The synchronizing signaling may include the second transition.

In one example, the UART may receive data from a receive line of the UART at a bit-rate different from a bit-rate at which the byte of data is transmitted on the transmit line. Bit-rates of transmissions in transmit and receive directions may be mutually independent.

Figure 11:
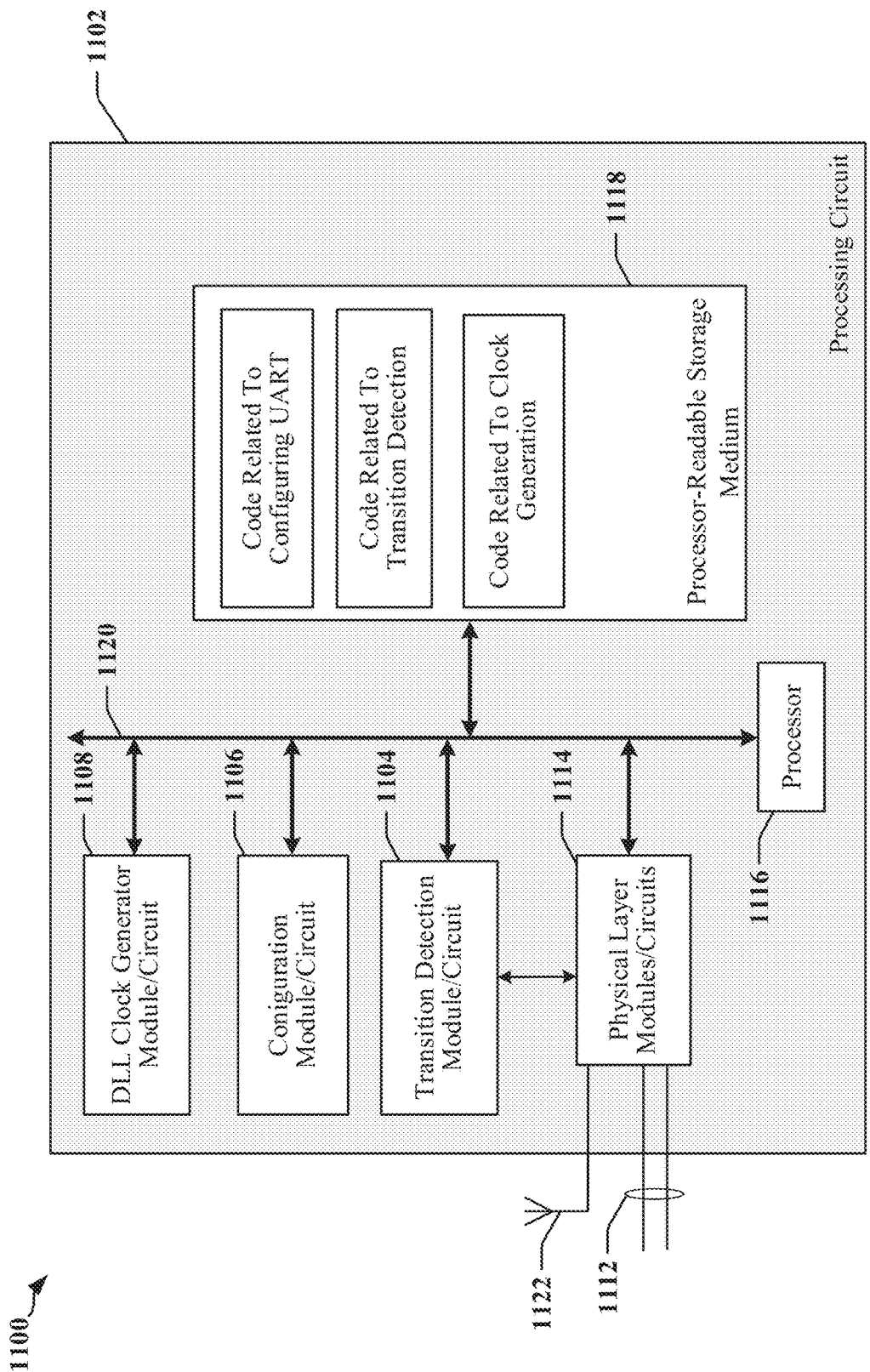
FIG. 11 illustrates a second example of a hardware implementation for an apparatus in accordance with certain aspects disclosed herein.

FIG. 11 is a diagram illustrating a simplified example of a hardware implementation for an apparatus 1100 employing a processing circuit 1102. The apparatus may implement a bridging circuit in accordance with certain aspects disclosed herein. The processing circuit typically has a controller or processor 1116 that may include one or more microprocessors, microcontrollers, digital signal processors, sequencers and/or state machines. The processing circuit 1102 may be implemented with a bus architecture, represented generally by the bus 1120. The bus 1120 may include any number of interconnecting buses and bridges depending on the specific application of the processing circuit 1102 and the overall design constraints. The bus 1120 links together various circuits including one or more processors and/or hardware modules, represented by the controller or processor 1116, the modules or circuits 1104, 1106 and 1108, and the processor-readable storage medium 1118. The apparatus may provide physical layer circuits 1114 that support a wired interface 1112 and a wireless interface 1122. The apparatus may have a plurality of wired interfaces 1112 adapted for full-duplex serial communication with flow control using a variable number of wires as defined for the wired interface 1112. The bus 1120 may also link various other circuits such as timing sources, peripherals, voltage regulators, and power management circuits, which are well known in the art, and therefore, will not be described any further.

The processor 1116 is responsible for general processing, including the execution of software, code and/or instructions stored on the processor-readable storage medium 1118. The computer-readable storage medium may include a non-transitory storage medium. The software, when executed by the processor 1116, causes the processing circuit 1102 to perform the various functions described supra for any particular apparatus. The computer-readable storage medium may be used for storing data that is manipulated by the processor 1116 when executing software. The processing circuit 1102 further includes at least one of the modules 1104, 1106 and 1108. The modules 1104, 1106 and 1108 may be software modules running in the processor 1116, resident/stored in the processor-readable storage medium 1118, one or more hardware modules coupled to the processor 1116, or some combination thereof. The modules 1104, 1106 and 1108 may include microcontroller instructions, state machine configuration parameters, or some combination thereof.

In one configuration, the apparatus 1100 includes modules and/or circuits 1106 adapted to configure the apparatus for SS-UART and/or HS-UART modes of operation, modules and/or circuits 1104 configured to monitor the wire after an idle period or stop bit for transitions, modules and/or circuits 1108 configured to generate a sampling clock synchronized to one or more transitions in signaling state of the wire after the idle period or stop bit.

The apparatus 1100 may include a clock generator having an edge detection circuit configured to detect a negative-transitioning first edge in a receive signal provided to a UART receiver circuit, and a positive-transitioning second edge in the receive signal. The clock generator may have a DLL responsive to the first edge and the second edge. The DLL may synchronize a sampling clock to the first edge and the second edge. The sampling clock may be used by the UART receiver circuit to capture data from the receive signal.

In some examples, the clock generator has a counter configured to count clock pulses in the sampling clock after the second edge. The clock generator may be disabled after a configured number of clock pulses have been transmitted in the sampling clock. In one example, the sampling clock has a period that is double a duration of time elapsed between the first edge and the second edge.

In various examples, the DLL is configured to synchronize the sampling clock for each data frame in the receive signal. Each data frame may include 8 or more data bits. One or more data frames may include a 7-bit address. One or more data frames may include an 8-bit byte of payload data. One or more data frames may include more than 8 bits of payload data. The DLL may enable per-frame, clock synchronization, with a variable number of data-bits accommodated per-frame, thereby providing throughput advantages. The DLL may automatically determine baud rate of the receive signal based on synchronization signaling provided before each data frame in the receive signal. The synchronization signaling may provide the first edge and the second edge.

In a first example, the processor-readable storage medium 1118 may include instructions for detecting a first transition in a signal received from a receive line of a UART after the receive line has been idle or following transmission of a stop bit on the receive line, detecting a second transition in the signal, synchronizing a sampling clock to the second transition, and using the sampling clock to capture a byte of data from the receive line. The first transition and the second transition may occur within a first half-cycle of the sampling clock.

In a second example, the processor-readable storage medium 1118 may include instructions for generating a transmit clock, providing a first transition in a signal transmitted on a transmit line of a UART after the transmit line has been idle or following transmission of a stop bit on the transmit line, providing a second transition in the signal such that the second transition is provided one-half cycle of the transmit clock after the first transition, and transmitting a byte of data on the transmit line in accordance with timing provided by the transmit clock.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method performed at a receiving device comprising:
   detecting a first transition in a signal received from a receive line of a universal asynchronous receiver/transmitter (UART) after the receive line has been idle or following transmission of a stop bit on the receive line;
   detecting a second transition in the signal;
   synchronizing a sampling clock to the second transition, wherein the first transition and the second transition occur within a first half-cycle of the sampling clock; and
   using the sampling clock to capture a byte of data from the receive line; and
   enabling a clock generator after detecting the first transition, wherein the clock generator is configured to generate the sampling clock when enabled.

2. The method of claim 1, further comprising:
   receiving a start bit from the receive line before capturing the byte of data.

3. The method of claim 1, further comprising:
   detecting the stop bit on the receive line; and
   disabling the clock generator after detecting the stop bit, wherein the clock generator is configured to suppress the sampling clock when disabled.

4. The method of claim 1, further comprising:
   receiving a message from a transmitting device requesting the receiving device to enter a super-speed UART (SS-UART) mode of operation prior to detecting the first transition; and
   initiating the SS-UART mode of operation in response to the message.

5. The method of claim 4, wherein initiating the SS-UART mode of operation comprises:
   enabling an edge-synchronized delay-locked loop in the clock generator.

6. The method of claim 1, further comprising:
   receiving a message from a transmitting device requesting the receiving device to enter a high-speed UART (HS-UART) mode of operation; and
   initiating the HS-UART mode of operation in response to the message.

7. The method of claim 6, wherein initiating the HS-UART mode of operation comprises:
   disabling an edge-synchronized delay-locked loop in the clock generator; and
   causing the clock generator to generate the sampling clock using an oversampling clock.

8. The method of claim 1, further comprising:
   transmitting a first message to a transmitting device requesting the transmitting device to enter a super-speed UART (SS-UART) mode of operation prior to detecting the first transition;
   receiving a second message in response to the first message; and
   initiating the SS-UART mode of operation in response to the second message.

9. The method of claim 8, wherein initiating the SS-UART mode of operation comprises:
   enabling an edge-synchronized delay-locked loop in the clock generator.

10. The method of claim 1, further comprising:
    transmitting a message to a transmitting device requesting the transmitting device to enter a high-speed UART (HS-UART) mode of operation; and
    initiating the HS-UART mode of operation in response to the message.

11. The method of claim 10, wherein initiating the HS-UART mode of operation comprises:
    disabling an edge-synchronized delay-locked loop in the clock generator; and
    causing the clock generator to generate the sampling clock using an oversampling clock.

12. The method of claim 1, further comprising:
    transmitting data over a transmit line of the UART at a bit-rate different from a bit-rate at which the byte of data is received from the receive line, wherein bit-rates of transmissions in transmit and receive directions are mutually independent.

13. The method of claim 1, further comprising:
    using an edge-synchronized delay-locked loop to synchronize the sampling clock at commencement of each of a plurality of data frames transmitted on the receive line.

14. The method of claim 13, wherein the sampling clock has a period that is double a duration of time elapsed between two edges detected after the receive line has been idle or following transmission of the stop bit on the receive line.

15. The method of claim 13, wherein each data frame includes 8 or more data bits.

16. A method performed at a transmitting device comprising:
generating a transmit clock;
providing a first transition in a signal transmitted on a transmit line of a universal asynchronous receiver/transmitter (UART) after the transmit line has been idle or after transmitting a first stop bit on the transmit line;
providing a second transition in the signal, wherein the second transition is provided one-half cycle of the transmit clock after the first transition; and
transmitting a byte of data on the transmit line in accordance with timing provided by the transmit clock; and
transmitting a second stop bit on the transmit line after the byte of data.

17. The method of claim 16, further comprising:
transmitting a start bit on the transmit line before the byte of data.

18. The method of claim 16, further comprising:
receiving a message from a receiving device requesting the receiving device to enter a super-speed UART (SS-UART) mode of operation prior to providing the first transition; and
initiating the SS-UART mode of operation in response to the message.

19. The method of claim 18, wherein initiating the SS-UART mode of operation comprises:
transmitting synchronizing signaling before transmitting the byte of data, wherein the synchronizing signaling includes the second transition.

20. The method of claim 16, further comprising:
transmitting a first message to a receiving device requesting the receiving device to enter a super-speed UART (SS-UART) mode of operation prior to providing the first transition;
receiving a second message in response to the first message; and
initiating the SS-UART mode of operation in response to the second message.

21. The method of claim 20, wherein initiating the SS-UART mode of operation comprises:
transmitting synchronizing signaling before transmitting the byte of data, wherein the synchronizing signaling includes the second transition.

22. The method of claim 16, further comprising:
receiving data from a receive line of the UART at a bit-rate different from a bit-rate at which the byte of data is transmitted on the transmit line, wherein bit-rates of transmissions on the transmit line and the receive line are mutually independent.

* * * * *